Aug. 10, 1943.  G. E. DATH  2,326,288
FRICTION SHOCK ABSORBING MECHANISM
Filed Aug. 23, 1941  2 Sheets-Sheet 1
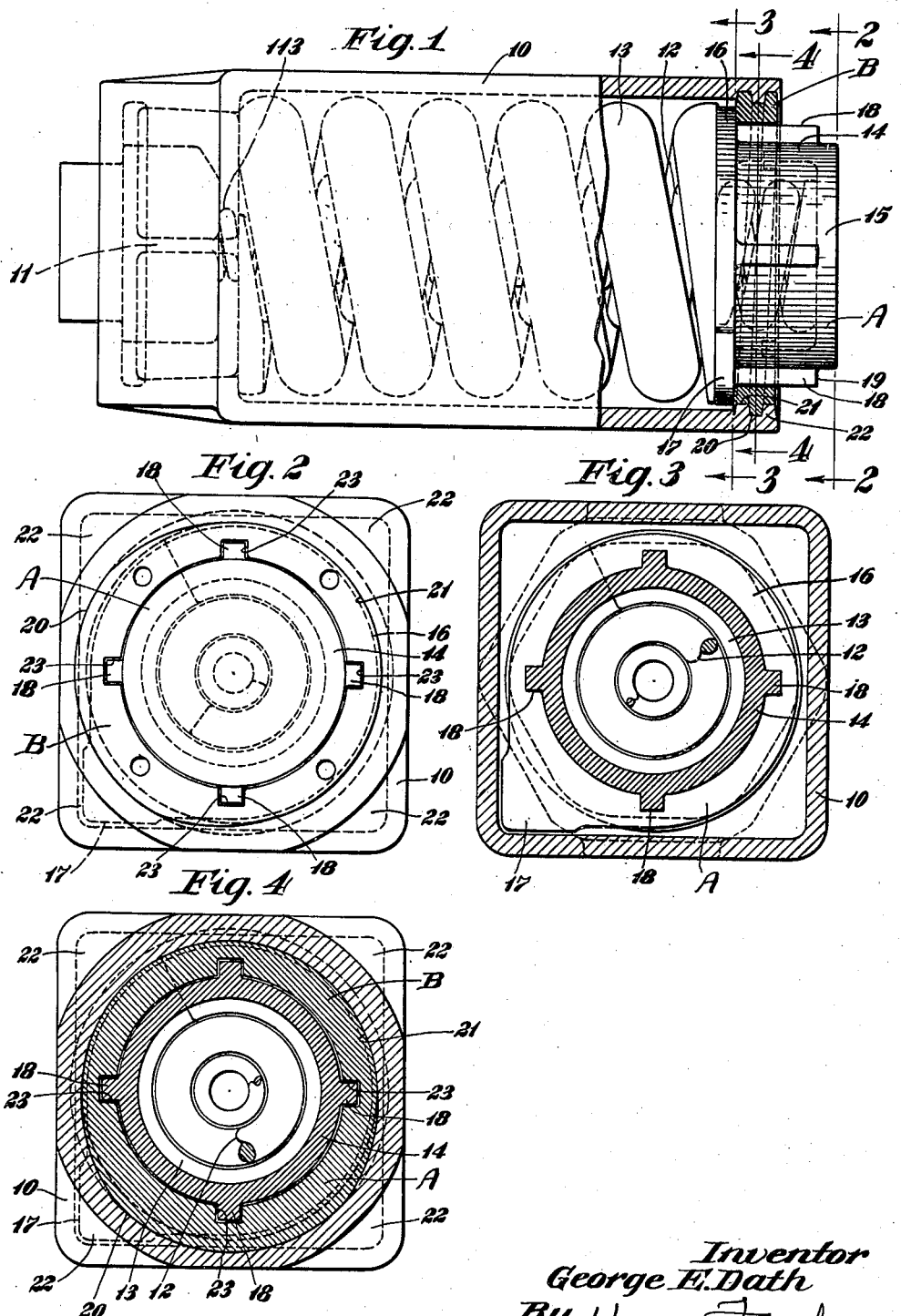
Inventor
George E. Dath
By Henry Fuchs
Atty.

Aug. 10, 1943.   G. E. DATH   2,326,288
FRICTION SHOCK ABSORBING MECHANISM
Filed Aug. 23, 1941   2 Sheets-Sheet 2
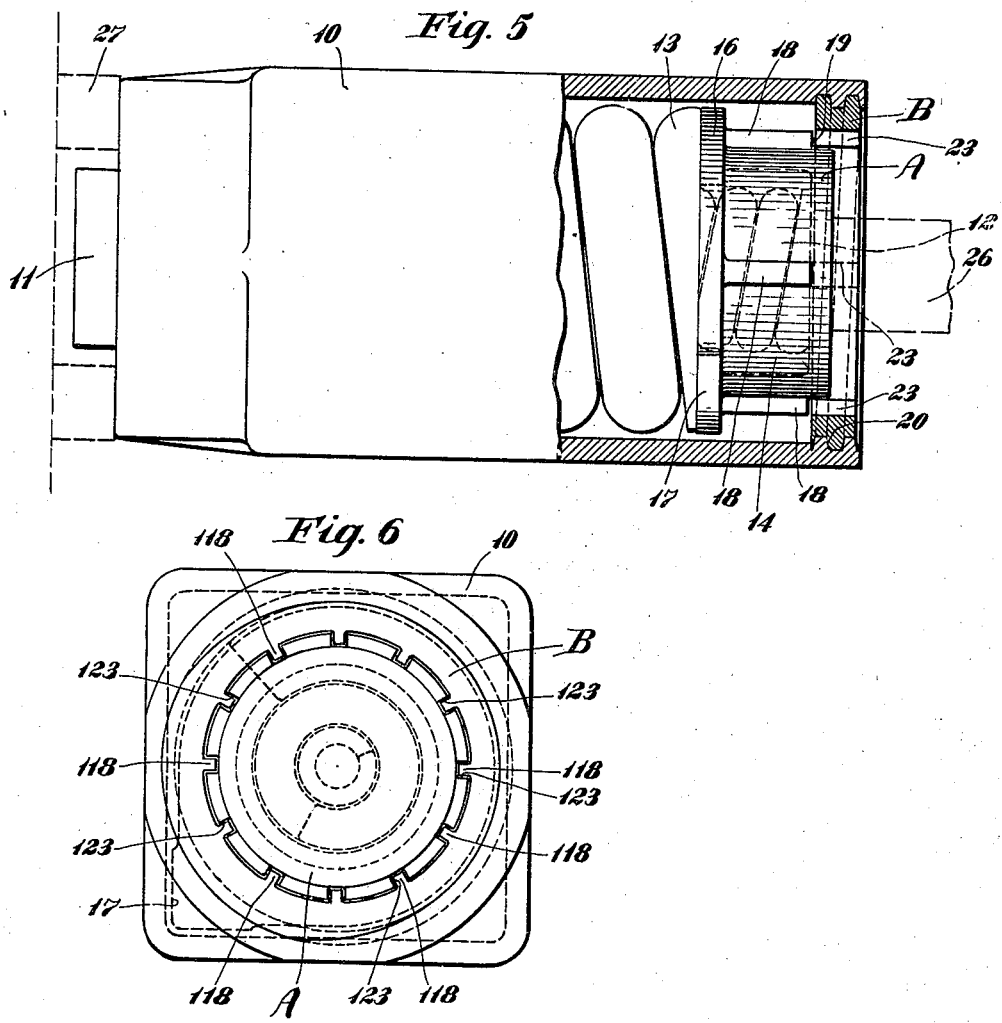
Inventor
George E. Dath
By Henry Fuchs
Atty.

Patented Aug. 10, 1943

2,326,288

UNITED STATES PATENT OFFICE 2,326,288

FRICTION SHOCK ABSORBING MECHANISM

George E. Dath, Mokena, Ill., assignor to W. H. Miner, Inc., Chicago, Ill., a corporation of Delaware Application August 23, 1941, Serial No. 408,025

4 Claims. (Cl. 213—22)

This invention relates to improvements in friction shock absorbing mechanisms, and more particularly to mechanisms of this character comprising a casing having a friction shell section at one end thereof, a friction clutch comprising a wedge and shoes slidable within the shell, a spring resistance opposing inward movement of the shoes, and a movable spring cap at the other end of the casing, movement of which inwardly of the casing is opposed by the spring resistance.

One object of the invention is to provide in a mechanism as set forth in the preceding paragraph, detachable retaining means for the spring cap, comprising a locking ring having a screw threaded connection with the casing and shouldered engagement with the spring cap, together with simple and efficient means for locking the screw ring against rotation to prevent accidental detachment of the same.

A more specific object of the invention is to provide means of the character indicated in the preceding paragraph, for locking the screw ring against rotation, comprising cooperating means on the casing and spring cap for holding the cap against rotation with respect to the casing, and interengaging means on the spring cap and screw ring for holding the latter against rotation, wherein the locked condition between the spring cap and the screw ring is maintained by the expansive action of the main spring resistance of the shock absorbing mechanism.

Other objects of the invention will more clearly appear from the description and claims hereinafter following.

In the drawings forming a part of this specification Figure 1 is a part plan and part horizontal longitudinal sectional view of a friction shock absorbing mechanism illustrating my improvements in connection therewith. Figure 2 is a rear elevational view of the mechanism looking in the direction of the arrows 2—2 of Figure 1. Figures 3 and 4 are transverse vertical sectional views corresponding respectively to the lines 3—3 and 4—4 of Figure 1. Figure 5 is a view similar to Figure 1 illustrating the manner of assembling the parts of the mechanism. Figure 6 is a view similar to Figure 2 illustrating another embodiment of the invention.

The friction shock absorbing mechanism comprises a friction casing 10 of substantially rectangular transverse cross section at the rear end portion thereof, a friction clutch 11 slidable within the casing, and springs 12, 13 and 113 opposing movement of the clutch. This mechanism thus far described is well known in the art, and is similar to the corresponding parts of the mechanism illustrated in Patent 2,050,541 granted to R. J. Olander, August 11, 1936, and the operation thereof is similar to the mechanism disclosed in this patent.

The wedge block of the friction clutch is held assembled with the casing by shouldered engagement with an inturned stop flange at the open end of said casing 10 in the same manner as in said Olander patent.

My improvements comprise broadly a spring cap A at the rear end of the casing 10 and interlocked therewith against relative rotation, and a retaining ring B having screw threaded connection with the casing and held against unscrewing by being interlocked with the spring cap.

The spring cap A is of cup-shaped form, comprising a short hollow cylindrical tube-like section 14 closed at its outer end by a transverse wall 15. At its inner end the cap A has a laterally outstanding retaining flange 16 which is of substantially circular form throughout the greater portion of the circumference of the cap. As shown in Figure 3, at the lower left hand corner of the casing 10, the flange 16 is laterally enlarged as indicated at 17 to fit said corner of the casing. In other words, the portion 17 is of right angular shape similar to the corresponding corner of the casing. The cylindrical portion 14 of the cap A is provided with four outstanding ribs 18—18—18—18, spaced equally about the circumference of the cap. These ribs extend lengthwise of the cap and terminate short of the outer end thereof as indicated at 19.

The retaining ring B has an external threaded connection 20 with the wall of a circular opening 21 provided in the transverse rear wall 22 of the casing 10. The opening of the ring B is of such a size as to accommodate the tubular portion 14 of the cap A for movement in a direction lengthwise of the gear.

The ring B is further provided with four internal notches 23—23—23—23 adapted to accommodate the ribs 18—18—18—18 which snugly fit within the same.

The main spring comprising the coils 12—13—113 of the shock absorbing mechanism bears directly on the spring cap A and normally holds the same in the projected position shown in Figure 1, thus locking the screw ring B against rotation with respect to the casing 10, the ribs 18 of the cap being engaged in the notches 23 of the ring thereby locking these two members together as a unit, and the projection 17 of the flange 16 of the cap A in turn locking the cap against rotation by being shouldered against the side walls of the casing 10.

In assembling the mechanism the friction clutch 11 and the springs 12—13—113 are first placed within the casing 10 by inserting the same through the opening 21 at the rear end of the casing. The enlarged portion of the flanged end of the spring cap A is then inserted through said opening 21 with the cap in tilted position and offset with respect to said opening to permit said enlarged portion 17 to pass freely through the opening. The cap is then moved laterally and righted to seat the portion 17 of the flange thereof in the corner of the casing and pass the remainder of the flange 16 through the opening 21. As shown in Figure 5, the cap is then forced inwardly against the resistance of the springs 12, 13 and 113, by a suitable tool, such as a bar or plunger 26 while the casing is buttressed against a block in the form of a ring 27 compressing the springs and brought to a position wherein the outer ends of the ribs 18 of the cap are disposed at a point inwardly of the position occupied by the ring B when the latter is in its normal assembled position with the casing. In this connection it is pointed out that the ring 27 is of greater thickness than the projection of the wedge of the clutch 11 thereby preventing the clutch from being forced inwardly during the assembling operation, so that the springs 12, 13 and 113 are compressed only due to inward displacement of the spring cap A. The ring B is then passed over the outer end of the cap and screwed into the opening 21 to secure the same to the casing 10. In securing the ring to the casing, the same is turned to a position wherein the notches 23 register with the ribs 18 of the cap A. Inward pressure is then removed from the cap A permitting the springs 12—13—113 to expand and force the same outwardly, thereby bringing the ribs 18 into interlocked relation with the notches 23.

When the mechanism has thus been completely assembled, outward movement of the cap A is limited by engagement of the flange 16 thereof with the retaining ring B, and the ring B is held against rotation by being interlocked with the cap A which in turn is held against rotation with respect to the casing 10 by the shouldered engagement provided between the side walls of the casing and the enlarged portion 17 of the flange of the cap.

The spring cap A may be readily removed when for any reason it is found desirable to take the gear apart, by forcing the cap A inwardly until the ribs 18 are disengaged from the ring B and unscrewing the ring B.

Referring next to the embodiment of the invention shown in Figure 6, the construction is the same as that illustrated in Figures 1 to 5 inclusive, with the exception that interlocking ribs and notches of the spring cap and ring are reversed. As shown in Figure 6, the ring B is provided with twelve ribs 118 and the cap A with a corresponding number of cooperating notches 123. Although twelve cooperating ribs and notches are illustrated in the drawings it will be evident that a greater or lesser number may be employed. As will be evident by increasing the number of cooperating ribs and notches a finer adjustment of the screw threaded locking ring B is obtained.

I have herein shown and described what I now consider the preferred manner of carrying out my invention, but the same is merely illustrative and I contemplate all changes and modifications that come within the scope of the claims appended hereto.

I claim:

1. In a shock absorbing mechanism, the combination with a casing having an open end provided with internal threads, said casing having meeting side walls forming a corner; of a spring cap slidable within the casing; an inwardly and outwardly adjustable retaining ring having external threads in threaded engagement with said internal threads of the casing for securing said ring to the casing and permitting inward and outward adjustment of said ring, said spring cap having shouldered engagement with said ring to limit outward movement of the cap, said cap having a lateral projection shouldered in the corner of the casing to hold said cap against rotation; interengaging locking means on the cap and ring for locking the same together against relative rotation but permitting relative longitudinal movement thereof; and spring means within the casing yieldingly holding said cap projected with the locking means thereof interlocked with the locking means of the ring.

2. In a shock absorbing mechanism, the combination with a rectangular casing having a circular opening at one end, said opening being threaded; of a spring cap slidable within the casing; a retaining ring in threaded engagement with the threads of said opening; said spring cap having an external flange at its inner end in shouldered engagement with the ring, said flange having an extension seated in one of the corners of the casing to hold said cap against rotation; interengaging means on said cap and ring to lock the same against relative rotation; and springs in the casing holding said cap projected and interlocked with the ring.

3. In a shock absorbing mechanism, the combination with a casing having an opening at one end, said casing being of angular cross section; of a retaining ring screwed into said opening; a spring cap slidable lengthwise of the mechanism and extending through said ring, said cap having a flange at the inner end in shouldered engagement with the ring to restrict outward movement of the cap; interengaging ribs and notches on said cap and ring to hold said ring and cap against relative rotation, said ribs being slidable lengthwise in said notches; an angular wing on said cap fitting in a corner of said casing for holding said cap against rotation with respect to said casing; and spring means in the casing yieldingly holding said cap projected.

4. In a shock absorbing mechanism, the combination with a casing having a rectangular rear end portion partly closed by a vertical end wall, said rear wall being provided with a circular opening which is internally threaded; of a threaded ring screwed into said opening; a spring cap having a cylindrical portion projecting through said ring, said cap having a flange at the inner end thereof adapted to seat on said ring to limit outward movement of said cap, said flange having a projecting angular portion fitting within one of the interior corners of the casing to lock said cap against rotation, said cap having longitudinally extending exterior ribs terminating short of the outer end of the cap; notches in said ring within which said ribs are engaged to lock the cap and ring together against relative rotation; and spring means within the casing normally holding said cap projected.

GEORGE E. DATH.